United States Patent [19]

James

[11] 4,059,502

[45] Nov. 22, 1977

[54] CATALYST WITHDRAWAL

[75] Inventor: Lewis C. James, East Windsor, N.J.

[73] Assignee: Cities Service Research and Development Company, Tulsa, Okla.

[21] Appl. No.: 641,852

[22] Filed: Dec. 17, 1975

[51] Int. Cl.² .............................................. C10G 13/00
[52] U.S. Cl. .................................. 208/152; 208/157;
208/DIG. 1; 222/54; 302/16; 302/66
[58] Field of Search ......... 208/143, 157, 152, DIG. 1;
222/54; 302/16, 66, 14

[56] References Cited

U.S. PATENT DOCUMENTS

| 2,325,611 | 8/1976 | Keranen | 208/152 |
| 3,547,809 | 12/1970 | Ehrlich et al. | 208/143 |

Primary Examiner—Herbert Levine
Attorney, Agent, or Firm—George L. Rushton

[57] ABSTRACT

In an upflow, ebullated bed reactor using a heterogeneous catalyst, a transport liquid compatible with the catalyst and the reactor feedstock is used. During the addition of fresh catalyst, a heated slurry of catalyst and transport liquid is pumped into the reactor under conditions to minimize (a) the temperature difference between the slurry and the reactor and (b) exposure of the fresh catalyst to a deactivating elevated temperature. During catalyst withdrawal, the temperature of the reactor effluent stream is controlled by mixing with a transport liquid. Measurement and flowability of the resultant mixture is thus assured.

2 Claims, 1 Drawing Figure

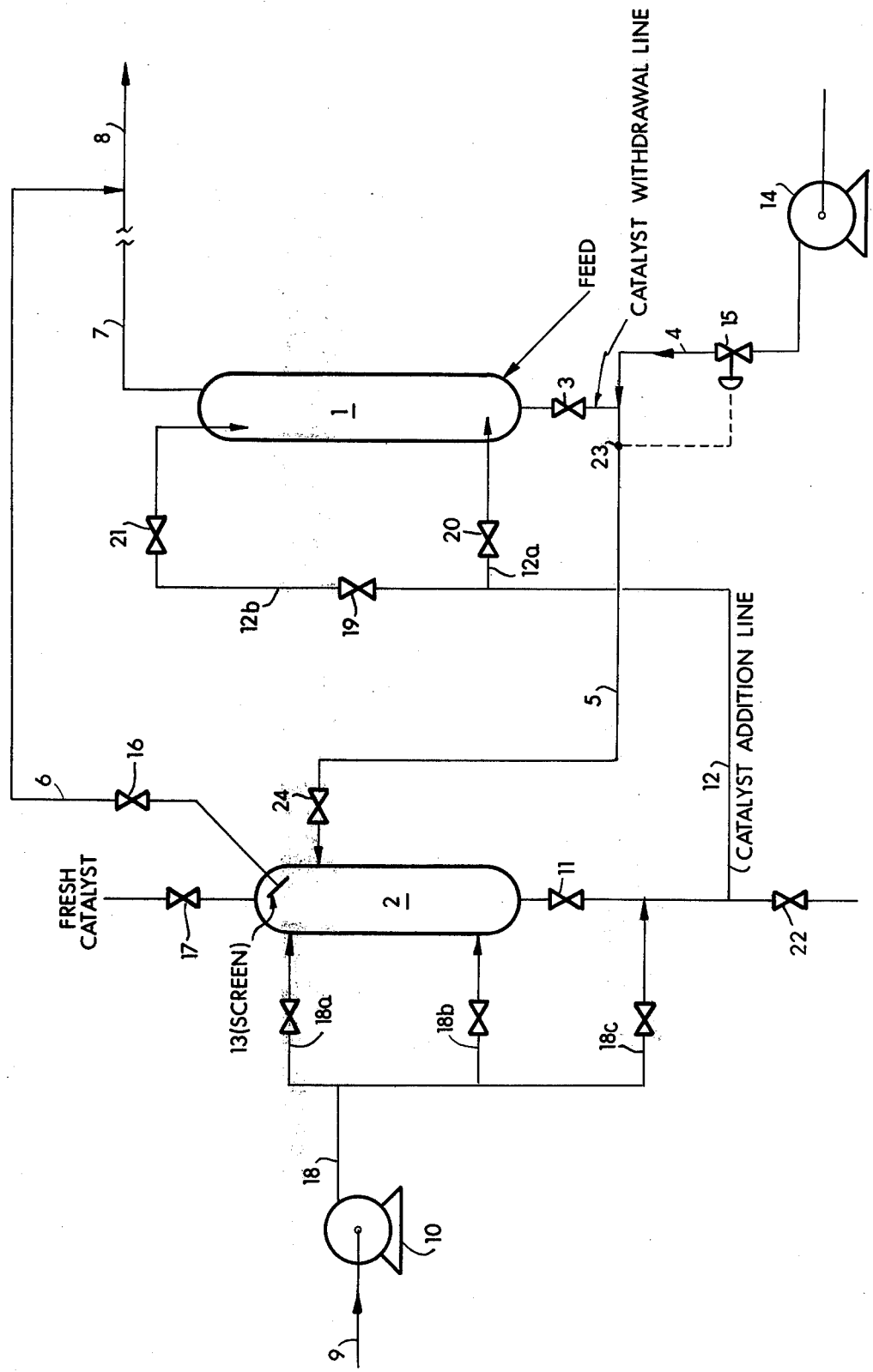

CATALYST WITHDRAWAL

BACKGROUND OF THE INVENTION

This invention relates to the addition and withdrawal of heterogeneous catalysts used in a catalytic process. In a particular embodiment, the invention relates to the addition and withdrawal of particulate catalyst used in the hydroprocessing of a heavy hydrocarbon residue.

By the incremental addition and withdrawal of catalyst to operating catalytic units, these units can be run on a continuous, rather than batch, basis. Downflow, fixed bed reactors are examples of batch flow, while upflow, ebullated bed reactors are preferably on a continuous basis. Thus, the addition and withdrawal of catalyst to such reactors is important.

U.S. Pat. Nos. 3,207,689 (Van Driesen), 3,336,217 (Meaux), 3,398,085 (Engle), 3,410,791 (Perry et al), 3,410,792 (Van Driesen and Stewart), 3,523,888 (Stewart and Van Driesen), and 3,547,809 (Ehrlich) teach prior methods of changing a catalyst charge. In the methods involving addition of catalyst to a reactor, it is customary to add the catalyst with gas or as a slurry of oil and catalyst to the reactor, apparently without regard to the temperature of the oil-catalyst mixture relative to the operating temperature of the reactor. If a large amount of mixture, at a temperature appreciably lower than that of the reactor, is added rapidly to the reactor, the reactor temperature will be reduced, thus upsetting some of the operating parameters. On the other hand, if a small stream of relatively cold catalyst-oil mixture is added without upsetting the reactor, it will take a long time to add an appreciable charge of new catalyst.

The typical prior art method of discharging used catalyst from a reactor comprises opening a discharge valve in the reactor and directing the effluent stream to a catalyst-oil separating vessel, with the driving force being the higher pressure in the reactor moving the catalyst-oil effluent to the separator. In this case, a change in pressure, in the reactor or in the discharge line, can result in a difference in flow rate to the separator, resulting in an approximation of the amount of catalyst discharged. Also, a great difference in pressure between the reactor and separator results in a rapid flow of the abrasive oil-catalyst mixture, which leads to valve and pipe erosion.

SUMMARY OF THE INVENTION

By using the present invention, I have overcome the disadvantages of prior methods of adding and withdrawing heterogeneous catalyst during normal operation. When fresh catalyst is to be added to a reactor, the improvement in the method of controlling the addition comprises minimizing the temperature difference between the incoming catalyst and the reactor temperature by the steps of mixing a transport liquid with the catalyst, with the transport liquid having an elevated temperature consistent with minimum coking of the oil, and minimizing the time that the catalyst is exposed to the heated transport liquid before the liquid-catalyst mixture is introduced into the reactor.

When used catalyst is to be withdrawn from the reactor, the improvement in the method of controlling the withdrawal comprises adding a transport liquid to the catalyst-reactor liquid effluent, and controlling the temperature of the resultant mixture.

BRIEF DESCRIPTION OF THE DRAWING

The FIGURE illustrates a diagrammatic view of an apparatus for carrying out the addition and withdrawal of catalyst during normal operations.

DESCRIPTION OF THE PREFERRED EMBODIMENT

The above-mentioned patents concerning catalyst addition and withdrawal discuss the background and operating conditions for a preferred embodiment of the present invention, namely, the catalytic hydroprocessing of a heavy hydrocarbon residue. The essential materials for the background and operating conditions of such methods are hereby incorporated in this application by reference to these patents. However, it is also noted that the invention can be used in related processes involving heterogeneous catalysts, especially those processes having continuous operations in which particulate catalyst is added to and withdrawn from the process. In a typical upflow, ebullated bed reactor for the hydroprocessing of heavy hydrocarbon residues, as illustrated in the accompanying figure, fresh catalyst from a catalyst holding vessel 2 can be added to a reactor 1. And, using much of the same equipment, used catalyst can be withdrawn from reactor 1, separated from the accompanying liquid in vessel 2, and discharged. In both of these operations, a transport liquid is used to facilitate movement of the particulate catlyst. This transport liquid is, broadly, any liquid compatible with the feedstock going to the reactor, and, in a preferred embodiment, is a liquid stream obtained from the downstream processing of the treated feedstock. Among such streams obtained are recycle oil, light cycle oil, heavy gas oil, and light gas oil. Other refinery streams, such as a neutral lube oil, atmospheric crude unit gas oil production; vacuum crude unit tower gas oil production, and delayed coker gas oil production, can be used. The transport liquid should have the characteristics, such as viscosity and specific gravity, to move the catalyst and to be compatible with the heavy hydrocarbon residual feedstock. The major function of the transport liquid is to dilute the reactor effluent stream to assure flowability.

In the addition of new catalyst to the reactor, the temperature of this catalyst-transport oil mixture is important. Under normal operating conditions, the reactor temperature is kept constant by balancing the exothermic heat of the hydrogenation reaction inside the reactor with the temperature of the incoming feed. Thus, when new catalyst is added in slurry form, it is important that the deviation of the reactor temperature from normal be minimized. I propose to do this by heating the transport oil to an elevated temperature, mixing the heated transport oil with the catalyst, and introducing the mixture into the reactor as promptly as possible. The temperature to which the transport liquid can be heated depends upon the petroleum fraction used as the transport liquid and how this fraction reacts to the proposed temperature. All oils, when heated above a temperature peculiar to each oil, will vaporize and undergo thermal cracking. If the transport liquid is heated to a point at which it undergoes thermal cracking, coke is formed which will deposit on the catalyst, causing deactivation, or which will cause operating difficulty in the heating of the liquid. Therefore, a general maximum temperature is indicated for each type of transport fluid used. Furthermore, the fresh catalyst, when exposed to transport liquid at an elevated temperature and in the absence of hydrogen, can become deactivated. Therefore, it is desirable to minimize the time when the fresh catalyst is exposed to the hot transport fluid. This exposure time can be minimized by rapid velocity of the mixture being pumped or by having the transport liquid-catalyst mixing vessel be located as close as possible to the reactor. By following these teachings, I have found that my method of addition is simple and effective and does not materially upset the equilibrium in the reactor.

To add fresh catalyst to reactor 1, fresh catalyst is first added to vessel 2. One method is to add dry, particulate catalyst through valve 17. Before the addition of catalyst, vessel 2 can be empty or it can contain transport liquid.

The next step is to purge air from vessel 2. This can be done in two ways. One way is to introduce an inert gas, such as nitrogen, into vessel 2, for example through valves 22 and 11. Depressuring of vessel can take place by opening valve 17. Another method is by filling vessel 2 with transport liquid, such as from line 9 through pump 10, line 18 and the valve in line 18b. When vessel 2 is filled with oil, valve 17 is closed. Pump 10 continues to build pressure in vessel 2 until that pressure is somewhat greater than the pressure in reactor 1. With valves 22, 11 and 17 closed, the valve in line 18c and valve 20 are opened, allowing the transport liquid to flow through line 12 into reactor 1. This step assures that line 12 is clear. If desired, pressure recorders can be installed at various points in line 12 to note if abnormally high pressure drops are observed. Also, the transport liquid and, ultimately, the catalyst slurry can be added through line 12b, using valves 19 and 21.

Now, valve 11 is opened, allowing the catalyst bed transport liquid slurry to flow through line 12. The valve in line 18b is opened and the valve in line 18c is gradually closed. Near the end of the transfer period, the valve 18a is opened to assist in washing all the catalyst from vessel 2. When the catalyst has been transferred from vessel 2 to reactor 1, valve 20 is closed, and the flow in line 9 to pump 10 is stopped. Although not shown, a furnace or other heating device precedes line 9 to heat the transport liquid to the desired temperature.

Catalyst can be added with fresh feed into reactor 1, but this procedure is not desirable, because, when the feed-catalyst mixture goes through the heating furnace, the catalyst is exposed to temperature which may deactivate it. In addition, if catalyst were added to the feedstock between the heating furnace and reactor, a pump would be needed to force the catalyst into the feedstock stream. There are pumps that can handle a solid and not break it, but these are very expensive and hard to operate. With the present procedure, the catalyst is slurried with oil at a reasonable temperature, which temperature is high enough to reduce any thermal shock of adding cold liquid to reactor 1. At the same time, the oil temperature is not high enough to deactivate the catalyst. Further, the liquid slurry of oil and catalyst is not exposed to a pump, thus minimizing catalyst damage during transfer.

Under operating conditions similar to those found in the addition procedure, much of the valving and piping found or used before will be used in this withdrawal procedure. It is desired to remove used catalyst from reactor 1, transfer this reactor effluent to vessel 2, separate the liquid portion from the particulate catalyst portion of the effluent, and discharge the used catalyst.

With operating conditions established in reactor 1, feedstock is introduced to reactor 1, and treated reactor effluent is removed through lines 7 and 8, for further processing. Valves 3, 20 and 21 are closed. The first step in catalyst withdrawal from reactor 1 is to be sure that the line associated with valve 3 is clear. Pump 14 which can be the same or different from pump 10, is started, to produce pressure on line 4, through open valve 15. A transport oil, such as a gas oil, is fed to pump 14. Valve 3 is opened and, with the pressure in line 4 being greater than the pressure in reactor 1, transport fluid moves through line 4 into reactor 1. At the same time, valves 24 and 16, leading to and from vessel 2, are opened so that the transport liquid can flow through line 5, fill vessel 2, and flow through line 6 into line 8. Temperature controller 15 is put into service, with the temperature of the fluid near the junction of line 4 and the withdrawal line from valve 3, as noted by sensor 23, being controlled at some point between the temperature of the transport fluid in line 4 and the reactor temperature. Since the initial flow of transport fluid in lines 4 and 5 is at a temperature below the set point, control valve 15 begins to close. As this valve closes, the pressure in line 4 decreases. When the pressure in line 4 reaches a certain value, a mixture of catalyst and oil will flow from reactor 1 through valve 3, joining the flow of transport oil through line 5. The catalyst-bearing mixture flows into vessel 2, through screen 13, line 6, and into line 8. Catalyst carried into vessel 2 will accumulate, partly by settling and partly by action of screen 13. Temperature controller valve 15 will close until the temperature in line 5 reaches the previously-determined set point. If valve 15 closes too far, the resultant temperature in line 5 will increase above the set point, and the controller will start to open valve 15, allowing the pressure in line 4 to increase and thus reduce the volume of catalyst and oil flowing from reactor 1. When the proper amount of catalyst has been removed from reactor 1, as calculated by the flow rate and the time, withdrawal is stopped by taking temperature control valve 15 out of service (opening valve 15). Thus, the flow of transport liquid in line 4, having a greater pressure than the pressure in reactor 1, forces transport liquid through valve 3 into reactor 1, washing catalyst and heavy oil out of the discharge line. Valve 3 is then closed. The flow of transport liquid in line 5 washes catalyst and heavy oil out of this line into vessel 2. After closing valves 24 and 16, pump 14 is stopped, and the slurry of used catalyst and oil in vessel 2 can be removed. There are many ways known of removing the slurry from vessel 2 and treating this slurry. Further, if vessel 2 needs to be rinsed, to assure removal of used particulate catalyst, additional transport liquid can be added and discharged.

Sensor 23 and temperature controller 15 are commercial items that are well known in the art. They must be able to withstand the operating temperatures and pressures found in the system.

I claim:

1. In a heterogeneous catalytic process wherein a solid catalyst is withdrawn from a reactor during normal operations, a method controlling the catalyst withdrawal from the reactor comprising pumping a transport fluid in a first conduit line equipped with a temperature controller and temperatures sensor, at a temperature $T_1$, exiting a portion of the reactor contents, comprising catalyst and liquid reactants at a temperature $T_2$, through a second conduit line that joins said first line, thus mixing the transport fluid and reactor effluent, measuring the temperature of the mixture, and controlling the flow of transport liquid and reactor effluent, and thus the flow of said catalyst, by controlling the temperature of the resultant stream, until sufficient catalyst is withdrawn from the reactor.

2. The method of claim 1 wherein the solid catalyst is used in the hydroprocessing of heavy residual hydrocarbons and the transport liquid is a liquid stream resulting from the downstream processing of said hydroprocessed heavy residual hydrocarbons.

* * * * *